United States Patent
Kato et al.

(10) Patent No.: US 7,271,933 B2
(45) Date of Patent: Sep. 18, 2007

(54) METHOD FOR CREATING CONVERSION TABLE FOR COLOR COPIER

(75) Inventors: Tetsuya Kato, Chiryu (JP); Tatsuya Sato, Ichinomiya (JP); Takahiro Ikeno, Owariasahi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 983 days.

(21) Appl. No.: 10/309,090

(22) Filed: Dec. 4, 2002

(65) Prior Publication Data

US 2003/0103222 A1 Jun. 5, 2003

(30) Foreign Application Priority Data

Dec. 5, 2001 (JP) ............................. 2001-371461

(51) Int. Cl.
- B41J 1/00 (2006.01)
- G03F 3/08 (2006.01)
- G06K 9/00 (2006.01)

(52) U.S. Cl. ................. 358/1.9; 358/523; 382/162; 382/167

(58) Field of Classification Search ............... 358/1.9, 358/523, 525, 518, 520; 382/162, 167; 345/604
See application file for complete search history.

(56) References Cited

U.S. PATENT DOCUMENTS 5,724,443 A * 3/1998 Nishikawa ................. 382/167
7,054,033 B2 * 5/2006 Namikata .................... 358/1.9
2003/0021470 A1 * 1/2003 Kakutani .................... 382/162

FOREIGN PATENT DOCUMENTS

| GB | 1595122 | 4/1977 |
|---|---|---|
| JP | 08-275007 | 10/1996 |
| JP | 11-331623 | 11/1999 |
| JP | 2000-078421 | 3/2000 |
| JP | 2000-261683 | 9/2000 |
| JP | A 2000-350049 | 12/2000 |

* cited by examiner

*Primary Examiner*—Kimberly Williams
*Assistant Examiner*—Charlotte M. Baker
(74) *Attorney, Agent, or Firm*—Oliff & Berridge, PLC

(57) ABSTRACT

L*a*b* values of an original image are obtained by measuring 6,000 color patterns with a colorimeter. RGB data for the 6,000 color patterns is also obtained by scanning the 6,000 color patterns with the color copier. The colorimeter is used to measure an image, which has been printed by the color copier based on CMY data for about 5,000 colors that is generated by a personal computer, in order to obtain L*a*b* values corresponding to the about 5,000 colors of CMY data. Then, CMY data corresponding to the L*a*b* values for the 6,000 colors is determined based on the relationship between the CMY data and L*a*b* values for the about 5,000 colors using a triangular pyramid interpolating method, thereby determining CMY data corresponding to the 6,000 colors of RGB data. The thus obtained RGB-CMY relationship data for 6,000 colors is compressed into RGB-CMY relationship data for 729 colors, using triangular pyramid interpolation, to obtain a conversion table.

11 Claims, 8 Drawing Sheets

FIG. 1(B)

729 RGB lattice points

| (R, G, B) | (C, M, Y) |
|---|---|
| (0, 0, 0) | ( , , ) |
| (0, 32, 0) | ( , , ) |
| ⋮ | ⋮ |
| (255, 255, 255) | ( , , ) |

← LUT 16

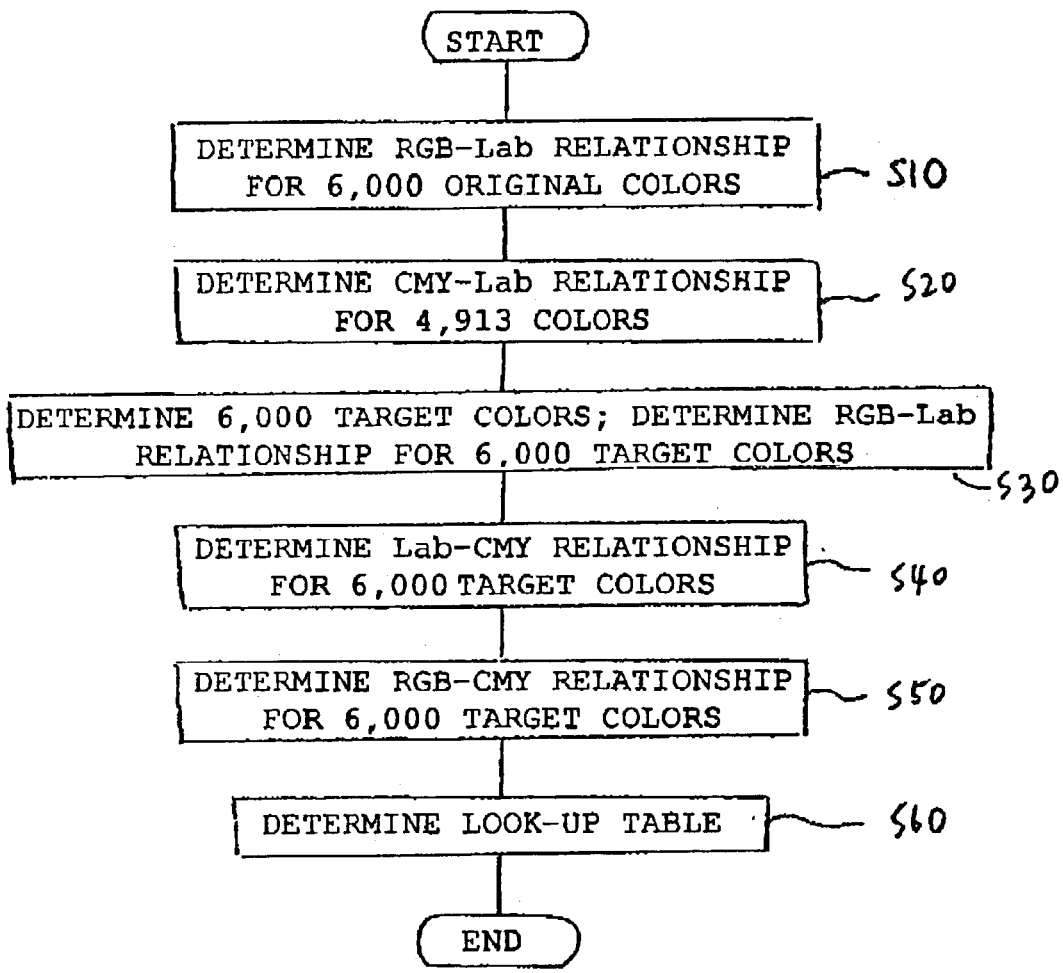

FIG. 4(A)

| (R, G, B) | (L*, a*, b*) |
|---|---|
| ( , , ) | ( , , ) |
| ⋮ | ⋮ |
| ( , , ) | ( , , ) |

← SCANNING PROFILE (RGB-Lab relationship)

} 6,000 original colors

FIG. 4(B)

| (C, M, Y) | (L*, a*, b*) |
|---|---|
| (0, 0, 0) | ( , , ) |
| (0, 16, 0) | ( , , ) |
| ⋮ | ⋮ |
| (255, 255, 255) | ( , , ) |

← RECORDING PROFILE (CMY-Lab relationship)

} 4,913 colors

FIG. 4(C) ← ADJUSTED SCANNING PROFILE

| (R, G, B) | (L*, a*, b*) |
|-----------|--------------|
| ( , , )   | ( , , )      |
| ⋮         | ⋮            |
| ( , , )   | ( , , )      |

} 6,000 target colors

FIG. 4(D) ← Lab-CMY relationship for 6,000 target colors

| (L*, a*, b*) | (C, M, Y) |
|--------------|-----------|
| ( , , )      | ( , , )   |
| ⋮            | ⋮         |
| ( , , )      | ( , , )   |

{ 6,000 target colors

FIG. 4(E)

| (R, G, B) | (C, M, Y) |
|---|---|
| ( , , ) | ( , , ) |
| ⋮ | ⋮ |
| ( , , ) | ( , , ) |

6,000 target colors {

RGB-CMY relationship for 6,000 target colors

METHOD FOR CREATING CONVERSION TABLE FOR COLOR COPIER

BACKGROUND OF THE INVENTION

1. Field of the Invention

The present invention relates to a method of creating a conversion table to be used by a color copier and the like for converting scanned color data into print data.

2. Description of Related Art

In conventional methods for obtaining copies of an original image with a color copier, the original image is scanned by CCDs and the like and RGB data is obtained as the scanned data. This RGB data is converted to C (cyan), M (magenta), and Y (yellow) values as print data, and a copy is printed based on these CMY values.

One method for converting RGB values to CMY values is first to convert the RGB values to values of a standard L*a*b* color system (hereinafter abbreviated to "L*a*b* values") and subsequently to convert these L*a*b* values to CMY values.

In another method disclosed in British Patent publication No. 1595122, the RGB values are converted directly into CMY values without temporarily converting the values into a standard L*a*b* color system. This type of conversion from scanned data to print data is performed by referencing to a look-up table that holds a relationship between the color system of the origin and the color system of the destination.

SUMMARY OF THE INVENTION

However, to create this look-up table, it has been necessary to set a temporary look-up table in the target copier and copy a color chart as the original image. Next, the image on the resulting copy is compared to the original color chart and the look-up table is adjusted accordingly. This process must be repeated until the colors in the resulting copy become as close as possible to the original colors. Hence, this process of copying an original image and adjusting the look-up table is problematic in that the cycle must be repeated many, many times, requiring much time to create an appropriate look-up table.

Especially when the copier is designed to support a plurality of copy modes and numerous paper types, it is necessary to provide a look-up table for each combination of copy mode, paper type, and the like. In this case, a large amount of time is necessary to create the look-up tables for all combinations.

Further, this method of adjustment cannot be performed by just anyone, but must be conducted by a skilled technician.

In view of the foregoing, it is an object of the present invention to provide a method of creating a conversion table, such as a look-up table, quickly and easily.

In order to attain the above and other objects, the present invention provides a method of creating a conversion table showing a relationship between scanned data and print data to be created by a color copier, the method comprising: a first step of measuring, by using a colorimeter, a plurality of colors in an original image to obtain colorimetric data of the plurality of colors on the original image, and reading, by using a color copier, the plurality of colors in the original image to obtain scanned data of the plurality of colors on the original image, thereby determining a first relationship between scanned data and colorimetric data for the plurality of colors in the original image; a second step of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets; a third step of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and a fourth step of creating, based on the fourth relationship, a conversion table showing a relationship between scanned data to be obtained by the color copier and print data desired to be obtained by the color copier.

According to another aspect, the present invention provides a color copier, comprising: a table storing portion storing a conversion table showing a relationship between scanned data and print data, the conversion table being produced by a method including: a first step of measuring, by using a colorimeter, a plurality of colors in an original image to obtain colorimetric data of the plurality of colors on the original image, and reading, by using the color copier, the plurality of colors in the original image to obtain scanned data of the plurality of colors on the original image, thereby determining a first relationship between scanned data and colorimetric data for the plurality of colors in the original image: a second step of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets; a third step of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and a fourth step of creating, based on the fourth relationship, a conversion table showing a relationship between scanned data to be obtained by the color copier and print data desired to be obtained by the color copier; and a copying portion executing a color copying operation by using the color conversion table, the copying portion including: a scanning portion scanning a desired original image to produce scanned data; a conversion portion converting the produced scanned data into print data by using the conversion table; and a recording portion recording the print data to produce a copy product of the original image.

According to another aspect, the present invention provides a program for being executed by a computer to create a conversion table showing a relationship between scanned data and print data to be created by a color copier, the program comprising: a first program of measuring, by using a colorimeter, a plurality of colors in an original image to obtain colorimetric data of the plurality of colors on the original image, and reading, by using a color copier, the plurality of colors in the original image to obtain scanned data of the plurality of colors on the original image, thereby determining a first relationship between scanned data and colorimetric data for the plurality of colors in the original image; a second program of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets; a third program of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and a fourth program of creating, based on the fourth relationship, a conversion table showing a relationship between scanned data to be obtained by the color copier and print data desired to be obtained by the color copier.

BRIEF DESCRIPTION OF THE DRAWINGS

The above and other objects, features and advantages of the invention will become more apparent from reading the following description of the preferred embodiment taken in connection with the accompanying drawings in which:

FIG. 1(B) shows a look-up table created by the conversion table creating system of FIG. 1(A);

FIG. 3 is a flowchart showing a conversion table creating process according to the preferred embodiment;

FIG. 4(A) shows a scanning profile (RGB-Lab relationship for 6,000 original colors) created during the conversion table creating process of FIG. 3;

FIG. 4(B) shows a recording profile (CMY-Lab relationship for 4,913 colors) created during the conversion table creating process of FIG. 3;

FIG. 4(C) shows an adjusted scanning profile (RGB-Lab relationship for 6,000 target colors) created during the conversion table creating process of FIG. 3;

FIG. 4(D) shows a Lab-CMY relationship for the 6,000 target colors created during the conversion table creating process of FIG. 3;

FIG. 4(E) shows a RGB-CMY relationship for the 6,000 target colors created during the conversion table creating process of FIG. 3; and FIGS. 5(A) through 5(C) are explanatory diagrams showing examples of interpolation methods, wherein FIG. 5(A) shows how to select four Lab points that serve as vertices of the smallest triangular pyramid containing a target Lab point, FIG. 5(B) shows the distances of the target Lab point and the four vertices, and FIG. 5(C) shows how to select four RGB points that serve as vertices of the smallest triangular pyramid containing a RGB lattice point.

DETAILED DESCRIPTION OF THE PREFERRED EMBODIMENT

Figure 1A:
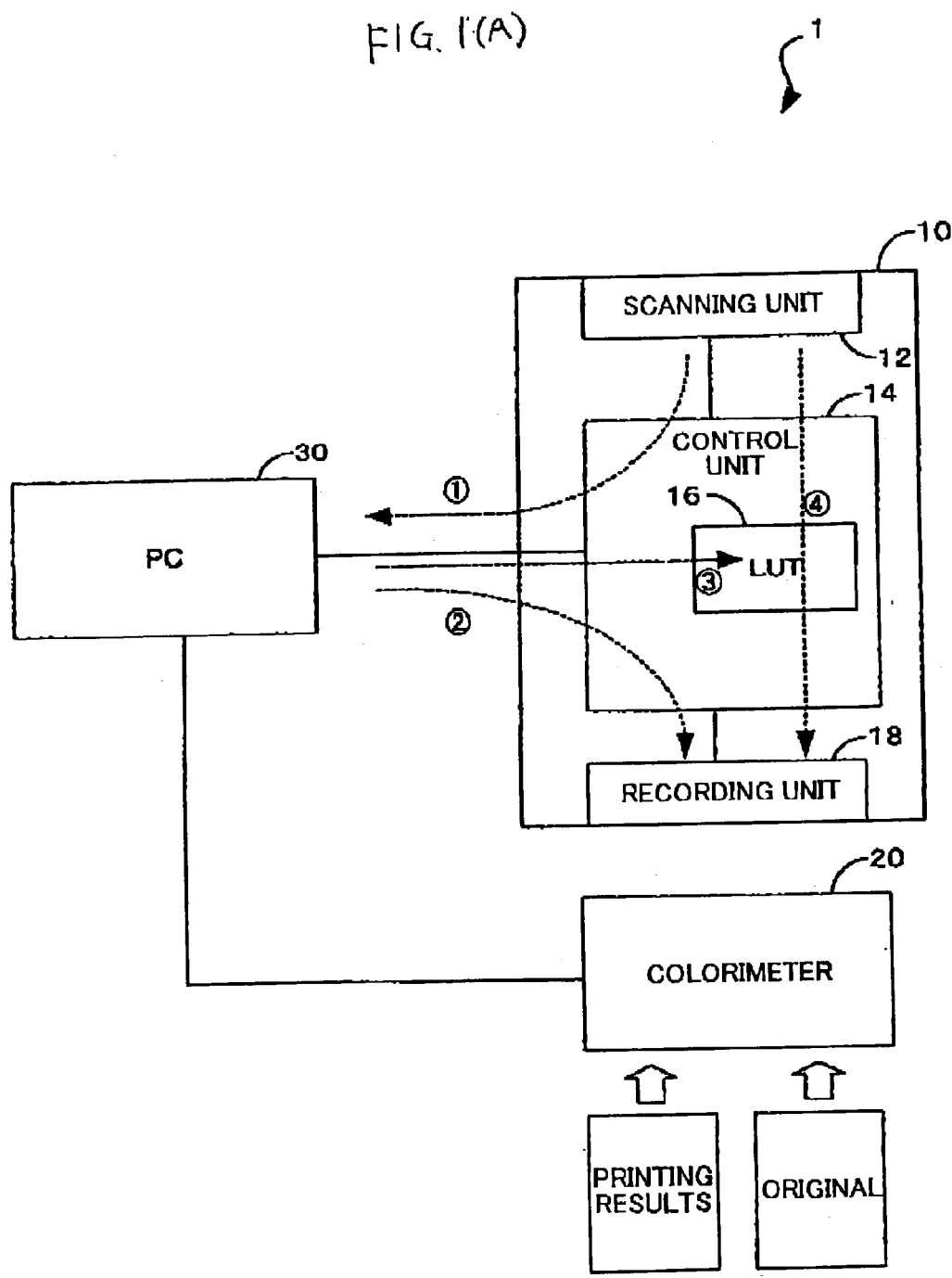
FIG. 1(A) is a block diagram showing the construction of a conversion table creating system according to a preferred embodiment of the present invention.

A method of creating a conversion table according to a preferred embodiment of the present invention will be described while referring to the accompanying drawings wherein like parts and components are designated by the same reference numerals to avoid duplicating description.

FIG. 1(A) is a block diagram showing the construction of a conversion table creating system 1 for achieving the method of creating a conversion table according to the preferred embodiment.

The system 1 includes: a color copier (color copying machine) 10; a colorimeter 20; and a personal computer 30. The personal computer 30 is connected to the color copier 10 and the colorimeter 20 via a network (interface, connecting cables, and the like). The colorimeter 20 is for receiving an original or a recorded paper (printing results) produced by the color copier 10, and for producing L*a*b* values (colorimetric data), which are values defined in the L*a*b* color system, indicative of colors at designated points on the original or the recorded paper.

The color copier 10 includes: a scanning unit 12; a control unit 14; and a recording unit 18. The scanning unit 12 includes a CCD or other scanning device such as CIS, and is for reading an original image and producing RGB scanned data for each pixel of the original image. The recording unit 18 includes a print head and a paper feeding mechanism (not shown). In this example, the print head in the recording unit 18 is an ink jet print head, and therefore the recording unit 18 receives CMYK data, and records images on paper using four colors of: C (cyan), M (magenta), Y (yellow), and K (black).

With this configuration, the color copier 10 is provided with: a scanned data transmission function (indicated by ① in FIG. 1(A)); a CMY data recording function (indicated by ② in FIG. 1(A)); a look-up table setting function (indicated by ③ in FIG. 1(A)); and a copying function (indicated by ④ in FIG. 1(A)).

By the scanned data transmission function ①, the control unit 14 transmits RGB data scanned from an original image by the scanning unit 12 to the personal computer 30. By the CMY data recording function ②, the control unit 14 controls the recording unit 18 to print onto paper CMY data received from the personal computer 30 via the network. By the look-up table setting function ③, the control unit 14 receives, from the personal computer 30 via the network, a look-up table (LUT/conversion table) 16 which has been generated by the personal computer 30, and sets the look-up table 16 for the color copier 10. The control unit 14 sets the look-up table 16 in its memory section (not shown). By the copying function ④, the control unit 14 converts the scanned RGB data read by the scanning unit 12 into corresponding CMY data using the look-up table 16 and controls the recording unit 18 to record this CMY data on the paper.

Next, the copying function will be described in greater detail with reference to FIG. 2.

Figure 2:
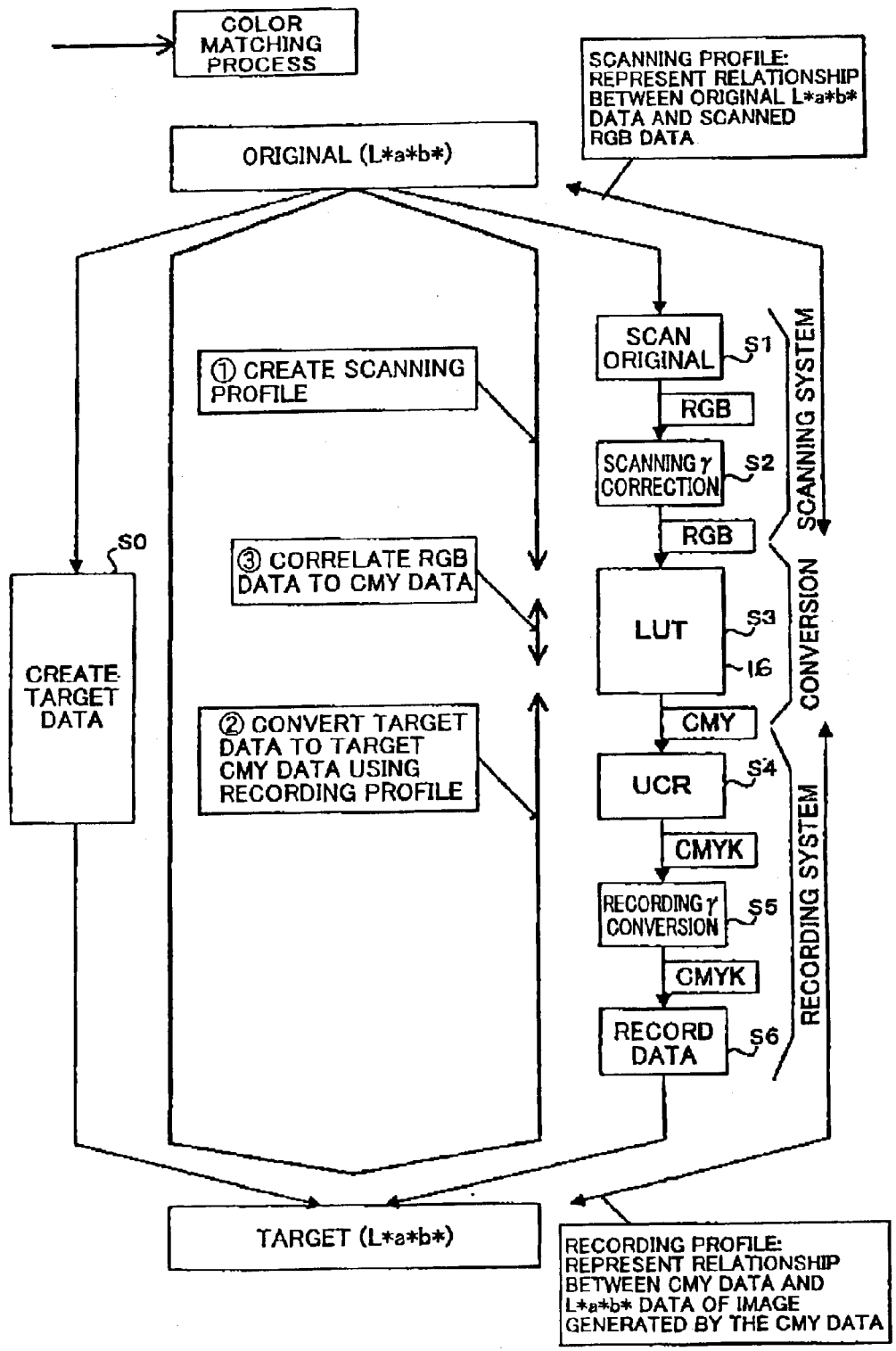
FIG. 2 is a schematic view showing the function of the conversion table creating system of FIG. 1(A)

The copying function is implemented by a scanning system process, a recording system process, and a conversion process as shown on the right side of the flowchart in FIG. 2.

In the scanning system process, the control unit 14 drives the scanning unit 12 in S1 to read an original image using a CCD or other scanning device included in the scanning unit 12 and to obtain RGB data for each pixel. In S2, the control unit 14 performs γ correction on this RGB data and obtains post-γ corrected RGB data. It is noted that the RGB data obtained by the scanning system process is represented by 8 bits per color component.

The conversion process is for converting RGB data generated by the scanning process into CMY data to be used in the recording system process. In the conversion process, the RGB data is converted in S3 to CMY data using the look-up table 16 according to the conversion process.

In the recording system process, the control unit 14 converts CMY data into CMYK data in S4 according to a UCR (Under Color Rejection) process. In S5, a γ correction process is executed on the CMYK data to obtain post-γ correction CMYK data. In S6, the control unit 14 controls the recording unit 18 to record the γ-corrected CMYK data on the paper.

Next will be described the look-up table 16 used in the conversion process (S3) to convert RGB data obtained by the scanning process (S1 and S2) into CMY data used in the recording process (S4–S6).

It is noted that an RGB color space is defined as a three-dimensional color space, wherein R-, G-, and B-axes extend perpendicularly with one another. Each of the R-, G-, and B-axes extend from its minimum value to its maximum value. In this example, RGB data (R, G, B) defined in the RGB color space is eight-bit data, and therefore the minimum value is zero (0) and the maximum value is 255. A RGB lattice space is defined by dividing the RGB color space uniformly into eight sections along each axis. That is, each axis is divided into eight sections in equal intervals with nine lattice points. Accordingly, the RGB lattice space has 9×9×9=729 lattice points: (0, 0, 0), (0, 32, 0), (0, 32, 32), (0, 64, 0), (0, 64, 64), . . . , (255, 255, 255).

As shown in FIG. 1(B), the look-up table 16 lists up the RGB value sets at all the 729 lattice points, which are spaced at equal distances between the minimum and maximum values in R-, G- and B-axial directions. The look-up table 16 stores one set of CMY data in correspondence with each RGB value set. In this way, the look-up table 16 holds relationships between RGB data at the lattice points and CMY data.

Next, the conversion process of S3 will be explained below in a greater detail.

A set of RGB data obtained by the scanning process is represented by 8 bits per color and, therefore, is full-color data indicative of one of 256×256×256=16,777,216 different colors. Hence, during the conversion process of S3, the scanned full-color RGB data is converted into CMY data using the look-up table 16 by an interpolation method. This conversion can be performed using volume interpolation or the like, as described in the British Patent publication No. 1595122, for instance.

More specifically, it is now assumed that one lattice cube has eight vertices (lattice points) with co-ordinates of (Ri, Gi, Bi), (Ri+N, Gi, Bi), (Ri, Gi+N, Bi), (Ri, Gi, Bi+N), (Ri+N, Gi+N, Bi), (Ri+N, Gi, Bi+N), (Ri, Gi+N, Bi+N), and (Ri+N, Gi+N, Bi+N), wherein N is the interval between the lattice points and is equal to 32 in this example. It is also assumed that the lattice cube includes a point P (R, G, B), which is indicative of the full-color RGB scanned data and which co-ordinates (Ri+Rf, Gi+Gf, Bi+Bf). In order to convert the RGB scanned data at point P (R, G, B) into CMY data, the cube is first divided into eight rectangular parallelepipeds by three planes which include the point P and are parallel to the faces of the cube. The CMY value U (R, G, B) at the point P is determined by adding up the values obtained by multiplying each known CMY value at each of the vertices of the cube by the volume of each rectangular parallelepiped which is positioned opposite to that vertex, thereby obtaining the following formula:

$$U(R, G, B) = U(Ri + Rf, Gi + Gf, Bi + Bf) =$$
$$(Ri, Gi, Bi)(N - Rf)(N - Gf)(N - Bf) +$$
$$(Ri + N, Gi, Bi)Rf(N - Gf)(N - Bf) +$$
$$(Ri, Gi + N, Bi)(N - Rf)Gf(N - Bf) +$$
$$(Ri, Gi, Bi + N)(N - Rf)(N - Gf)Bf + (Ri, Gi + N, Bi + N)$$
$$(N - Rf)(GfBf + (Ri + N, Gi, Bi + N)Rf(N - Gf)Bf +$$

-continued
$$(Ri + N, Gi + N, Bi)RfGf(N - Bf) +$$
$$(Ri + N, Gi + N, Bi + N)RfGfBf.$$

With the above-described configuration, the system 1 of the present embodiment creates the look-up table 16 in a manner described below.

According to the present embodiment, the personal computer 30 executes a look-up table creating program, as shown in FIG. 3, which is stored in a memory section (not shown) in the personal computer 30, thereby creating the look-up table 16.

First, in S10, the personal computer 30 controls the color copier 10 to scan a predetermined color chart (original image). The color chart is printed with 6,000 predetermined color patterns. Accordingly, the 6,000 sets of RGB scanned data indicative of the 6,000 original colors in the original image are obtained. In addition, the personal computer 30 controls the colorimeter 20 to measure the 6,000 color patterns in the original image. As a result, 6,000 sets of L*a*b* color data (colorimetric data) indicative of the 6,000 original colors in the original image are obtained. The personal computer 30 creates a RGB-Lab relationship (scanning profile) indicative of the relationship between the RGB values and the L*a*b* values for each of the 6,000 original colors as shown in FIG. 4(A). In this way, a RGB-Lab relationship for the 6,000 original colors is obtained for the scanning system of the color copier 10.

The process of S10 will be described below in greater detail.

First, the color copier 10 scans the 6,000 original colors in the original image (color chart) by using the function of S1 in FIG. 2. The color copier 10 obtains RGB data based on the scanned image by using the function of S2 in FIG. 2. The personal computer 30 receives this RGB scanned data from the color copier 10. This process is equivalent to process ① in FIGS. 1 and 2.

The colorimeter 20 measures L*a*b* color values for the respective color patterns on the original image. The personal computer 30 receives the L*a*b* color values from the colorimeter 20.

The personal computer 30 obtains the RGB-Lab relationship (scanning profile) between the L*a*b* values and RGB scanned data of the 6,000 original colors based on information on the recording positions of the 6,000 color patterns on the original image (color chart). The RGB-Lab relationship (scanning profile) is shown in FIG. 4(A). The personal computer 30 stores the RGB-Lab relationship (scanning profile) in its memory section (not shown).

Next, in S20, the personal computer 30 controls the color copier 10 to print 4,913 sets of predetermined CMY print data indicative of 4,913 colors. The 4,913 sets of CMY print data are comprised from 4,913 (=17×17×17) combinations of CMY data. The color copier prints this color chart. The personal computer 30 controls the colorimeter 20 to measure the printed results and to determine 4,913 sets of L*a*b* values for all the 4,913 colors. In this way, a CMY-Lab relationship between CMY data and the L*a*b* values for the 4,913 colors is obtained as shown in FIG. 4(B) for the recording system (printing system) of the color copier.

The step S20 will be described below in greater detail.

The personal computer 30 prepares 17×17×17=4,913 color combinations of CMY data, wherein each of C, M, and Y has seventeen values of 0, 16, 32, 48, . . . , 255. That is, the personal computer 30 prepares 4,913 color combinations: (0, 0, 0), (0, 16, 0), (0, 16, 16), . . . , (255, 255, 255).

This data is transmitted to the color copier 10 in order to print color patterns of the 4,913 colors. The color copier 10 receives this data and records the color patterns on paper using the recording unit 18 and using the function of S4–S6 of FIG. 2.

The colorimeter 20 detects the L*a*b* color values of the recorded 4,913 color patterns. The personal computer 30 receives a set of L*a*b* values for each of all the 4,913 colors from the colorimeter 20.

The personal computer 30 creates a CMY-Lab relationship (recording profile) between the CMY data and the L*a*b* data for the 4,913 colors, and stores the CMY-Lab relationship in its memory section (not shown) as shown in FIG. 4(B).

It is noted that in the present embodiment, the step S20 is executed after the step S10. However, the step S10 may be executed after the step S20. The steps S10 and S20 may be executed substantially simultaneously with each other.

Next, in S30, the personal computer 30 adjusts the 6,000 sets of L*a*b* color data in the RGB-Lab relationship (scanning profile) (FIG. 4(A)), which has been obtained in S10, into 6,000 sets of L*a*b* target color data indicative of 6,000 target colors, into which the color copier 10 should reproduce the 6,000 original colors in the original image (color chart). As a result, the RGB-Lab relationship is modified into an adjusted RGB-Lab relationship as shown in FIG. 4(C)). The look-up table 16 will be created in the subsequent processes by using this target L*a*b* color data.

The step S30 will be described below in greater detail.

In S30, the personal computer 30 creates 6,000 sets of target L*a*b* values (target data) based on the 6,000 sets of L*a*b* values indicative of the 6,000 original colors in the original image (S0 in FIG. 2).

The 6,000 sets of target L*a*b* values are indicative of what colors the 6,000 colors in the original image should be ultimately recorded as by the present copier 10. In other words, the target L*a*b* values indicate what Lab values should be obtained when the printing results of the copy of the original image are measured by the colorimeter 20.

It is noted that when the original is copied by the color copier 10, the L*a*b* values for the printed results are not always the same as the L*a*b* values measured from the original image. This is because the reproducible range (gamut) of the original image is different from the reproducible range (gamut) of the color copier 10. Accordingly, there is a possibility that some of the 6,000 sets of L*a*b* values for the original image, which are now set in the RGB-Lab relationship of FIG. 4(A) and which are included in the reproducible range (gamut) of the original image, will be out of the reproducible range (gamut) of the color copier 10.

Considering this potential problem, the personal computer 30 adjusts in S30 the 6,000 sets of L*a*b* values for the original image, which are now set in the RGB-Lab relationship of FIG. 4(A), into 6,000 sets of L*a*b* target values which are completely included in the reproducible range (gamut) of the color copier 10. The personal computer 30 creates the adjusted RGB-Lab relationship of FIG. 4(C) that lists up the 6,000 RGB data sets the same as those in the original RGB-Lab relationship of FIG. 4(A), but that lists up the 6,000 target L*a*b* values in place of the 6,000 original L*a*b* values.

For example, when the recording mode of the color copier 10 is set in an ink conservation mode, it is impossible to reproduce brightness levels for all the 6,000 colors in the original image, but it is impossible to record dark black colors, for example. Therefore, in S30, the L* value, serving as the brightness value, in each of the 6,000 sets of L*a*b* color values is reduced into a value within the reproducible range of the color copier 10. For example, the L* value in each of the 6,000 sets of L*a*b* color values is multiplied by a coefficient of a fixed amount, 0.8, for example, to produce the target L*a*b* values. It is possible to adjust the a* and b* values to determine the target L*a*b* values depending on the print modes, recording characteristics of the recording system, and the like.

In this way, the adjustment of S30 is executed dependently on the reproducibility of the L*a*b* colorimetric data of the original image and the reproducibility of the copier, such as the characteristics of the recording system in the copier.

Next, in S40, the personal computer 30 creates a Lab-CMY relationship for the 6,000 target colors based on the CMY-Lab relationship (recording profile) (FIG. 4(B)) for the 4,913 colors that has been obtained in S20. The Lab-CMY relationship for the 6,000 target colors is as shown in FIG. 4(D), and is indicative of the relationship between the 6,000 sets of target L*a*b* color values and 6,000 sets of CMY print data for reproducing the 6,000 target L*a*b* color values.

It is noted that one applicable method for determining the Lab-CMY relationship for the 6,000 target colors is: to select, for each target color, one CMY data set, among the 4,913 CMY data sets in the CMY-Lab relationship, whose corresponding L*a*b* value set is the nearest to the L*a*b* value set of the subject target color; and to set the selected CMY data set as a CMY print data set for reproducing the subject target color. However, according to the present embodiment, in order to improve the reproducibility of the target colors, an interpolation calculation is executed in S40 onto the CMY-Lab relationship (FIG. 4(B)) for the 4,913 colors, thereby determining the Lab-CMY relationship for the 6,000 target colors.

The step S40 will be described below in greater detail.

Figure 5A:
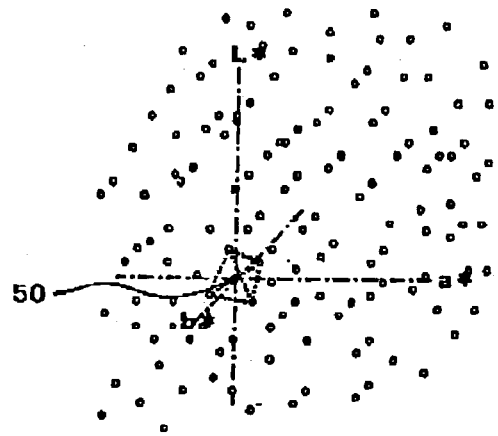

When plotting the 4,913 L*a*b* color value sets in the CMY-Lab relationship (FIG. 4(B)) in a predetermined L*a*b* color space, each point can be represented by unfilled circles as shown in FIG. 5(A). One set of the target L*a*b* values is indicative of one of the 6,000 target colors is plotted in the same L*a*b* color space by a filled circle as a point 50. In S40, a CMY value set corresponding to the L*a*b* value set at this point 50 is determined in a manner described below.

Figure 5B:
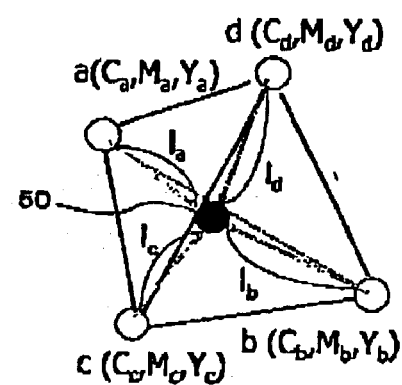

First, four white circles, which serve as vertices of the smallest triangular pyramid that contains the point 50 therein, are selected. In this example, four white circles a, b, c, d are selected as shown in FIG. 5(B) It is assumed that the CMY-Lab relationship in FIG. 4(B) lists up CMY data sets (Ca, Ma, Ya), (Cb, Mb, Yb), (Cc, Mc, Yc), (Cd, Md, Yd) for the four white circles a, b, c, d.

In such a case, the CMY value set for point 50 is determined by calculating the distances la, lb, lc, ld from the four points a, b, c, d to the point 50 and giving weight coefficients Wa, Wb, Wc, Wd to the four points a, b, c, d in order to emphasize CMY values relatively nearer to the point 50. By multiplying the weight coefficients Wa, Wb, Wc, Wd to the CMY values at the four points a, b, c, d and adding them together, it is possible to determine the CMY values at the point 50.

In other words, the personal computer 30 calculates the following formula to determine a CMY value set for the target color point 50:

$$C = Wa \times Ca + Wb \times Cb + Wc \times Cc + Wd \times Cd$$

$$M = Wa \times Ma + Wb \times Mb + Wc \times Mc + Wd \times Md$$

$$Y = Wa \times Ya + Wb \times Yb + Wc \times Yc + Wd \times Yd$$

wherein Wa=(lto−la)/(3×lto), Wb=(lto−lb)/(3×lto), Wc=(lto−lc)/(3×lto), Wd=(lto−ld)/(3×lto), and lto=la+lb+lc+ld.

The personal computer 30 determines 6,000 CMY data sets for all the 6,000 target L*a*b* values (6,000 target colors) according to this triangular pyramid interpolation method.

In this way, according to the present embodiment, the triangular pyramid interpolation is employed to determine the Lab-CMY relationship (FIG. 4(D)) for the 6,000 target colors based on the CMY-Lab relationship (FIG. 4(B)) for the 4,913 colors.

By creating the Lab-CMY relationship for the 6,000 target colors through the interpolation calculation and by creating the look-up table 16 based on the Lab-CMY relationship for the 6,000 target colors as described below, the copier will obtain, by using the look-up table 16, a desirable copy output whose colors are nearer to the colors of an original image.

Next, in S50, the personal computer 30 determines RGB-CMY relationship for the 6,000 target colors based on: the adjusted RGB-Lab relationship (FIG. 4(C)) for the 6,000 target colors; and the Lab-CMY relationship (FIG. 4(D)) for the 6,000 target colors. The RGB-CMY relationship for the 6,000 target colors are as shown in FIG. 4(E) and is indicative of the relationship between 6,000 sets of RGB scanned data for the 6,000 target colors and CMY print data for reproducing the 6,000 target colors.

Next in S60, the personal computer 30 determines the look-up table 16 based on the RGB-CMY relationship (FIG. 4(E) for the 6,000 target colors. As shown in FIG. 1(B), the look-up table 14 shows the RGB-CMY relationship between the 729 sets of RGB scanned data and 729 sets of CMY print data that reproduce colors of the 729 sets of RGB scanned data. When S60 is completed, the conversion table creating process ends.

It is conceivable to set the RGB-CMY relationship (FIG. 4(E)) for the 6,000 target colors as it is for the look-up table 16. However, if the 6,000 color patterns included in the original image (color chart) are distributed ununiformly in the reproducible range of the recording system of the color copier, some colors may have a high reproducibility but other colors have a low reproducibility. Additionally, the look-up table 16 has to store data of the RGB-CMY relationship for all the 6,000 target colors, and therefore the data amount of the look-up table 16 will result in a considerably large amount of data.

According to the present embodiment, therefore, the look-up table 16 is obtained by executing an interpolation calculation onto the RGB-CMY relationship (FIG. 4(E)) for the 6,000 target colors to create RGB-CMY relationships for the 729 RGB lattice points which are set at the prescribed uniform (equal) interval (32) in the RGB color space.

The step S60 will be described below in greater detail.

In S60, the personal computer 30 determines a relationship between RGB data and CMY data at the 729 RGB lattice points based on the RGB-CMY relationship (FIG. 4(E)) for the 6,000 target colors by using the triangular pyramid interpolation method.

Figure 5C:
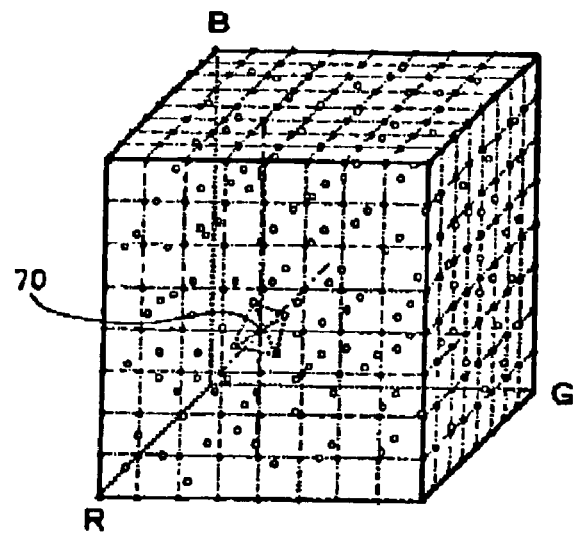

That is, the 6,000 RGB data sets in the RGB-CMY relationship (FIG. 4(E)) are plotted in the RGB color space of FIG. 5(C) where the axes R, G, and B extend perpendicularly with one another. The 6,000 points are represented by unfilled circles in FIG. 5(C). CMY values for the lattice points, shown by the filled circles in FIG. 5(c), are determined through triangular pyramid interpolation.

That is, for each lattice point, four points (four white circles) are selected among the 6,000 points to form vertices of the smallest triangular pyramid encompassing the target lattice point. The distances from each of the four points to the target lattice point are calculated, and weight coefficients are determined at the four points to emphasize the CMY values for points nearer the lattice point. By applying the weight coefficients to the CMY values at the four points and adding them together, it is possible to determine the CMY value set at the lattice point. In this way, it is possible to obtain a CMY data set for each of all the 729 RGB lattice points indicated by the filled circles in FIG. 5(C), thereby reducing the size of the look-up table 16.

In this way, CMY values for the RGB scanned data distributed in the RGB color space at the regular intervals are determined by applying interpolation onto the RGB-CMY relationship (FIG. 4(E)) between the RGB scanned data and CMY print data for the 6,000 target colors. Interpolation calculation is executed to limit the RGB-CMY relationship for the 6,000 target colors into the RGB-CMY relationship at only 9×9×9=729 RGB lattice points.

In this way, the RGB-CMY relationship of FIG. 1(B) between RGB data and CMY data at 729 RGB lattice points is created in the form suited to the data construction of the look-up table 16 to be used by the control unit 14 of the color copier 10. By using the look-up table setting function ((3)) in FIG. 1(A)), data of this RGB-CMY relationship of FIG. 1(B) is transmitted from the personal computer 30 to the control unit 14, and set as the look-up table 16 in the color copier 10. The look-up table 16 is set in a memory section (not shown) of the control unit 14.

The color copier 10 will execute a color copying operation by using the color conversion table 16. That is, the scanning unit 12 scans a desired original image to produce RGB scanned data. The control unit 14 converts the RGB scanned data into CMY print data by using the conversion table 16 and by using an interpolation method after executing the γ correction onto the RGB data. After executing the γ correction onto the CMY data to produce CMYK data, the recording unit 14 records the CMYK print data to produce a copy output of the original image.

In this way, according to the present embodiment, it is possible to create quickly and easily the look-up table 16 that is capable of reproducing the target colors of the original image almost exactly. Moreover, since the processes can be automatically performed by computer programs executed by the personal computer 30, color copier 10, and colorimeter 20, anyone can perform the method of the present embodiment to create a look-up table 16 without relying on a skilled technician.

If the color copier 10 has a plurality of copy modes or when the color copier 10 is capable of printing a plurality of kinds of paper, for instance, the color copier 10 has to use a plurality of different look-up tables 16. In such a case, the conversion table creating process of FIG. 3 has to be executed repeatedly in correspondence with the plurality of copy modes and/or the plurality of paper kinds. However, because the conversion table creating process of FIG. 3 can be executed quickly and easily, it is possible to quickly and easily create the plurality of different look-up tables 16 in correspondence with the various copy modes and/or with the plurality of paper types.

It is noted that the plurality of different copy modes and the plurality of different paper types have different reproducible ranges. Accordingly, during the conversion table creating process for each copy mode and/or each paper kind, the target L*a*b* color values are determined in S30 dependently on the reproducible range of the subject copy mode and/or the subject paper kind. Especially, during the conversion table creating process for each paper kind, the color chart used in S10 and the paper, onto which printing is performed in S20, should be of the subject paper kind.

Since it is easy to create the look-up table 16 with the method of the present embodiment, the look-up table 16 can also be easily modified by modifying parameters for color correction and the like in the scanning system or recording system, as in steps S2 (scanning γ correction), S4 (UCR), and S5 (recording γ correction) of FIG. 1(A). The entire color matching process of steps S2–S5 can be performed quickly and easily.

As described above, according to the present embodiment, it is possible to reduce the size of the conversion table and to eliminate non-uniform distribution of RGB data points in the RGB color space in the conversion table. With the conversion table thus produced, it is possible to attain an appropriate conversion for any color and to reduce the color difference between the original and copy product.

The method for creating a conversion table described above eliminates the need for repeating the process of copying the original, comparing the copy to the original, and adjusting the look-up table. Accordingly, it is possible to create a conversion table quickly and easily. Even with copiers that support a plurality of copy modes and a plurality of paper types, requiring that a conversion table be created for each combination of copy mode, paper type, and the like, it is possible to create such conversion tables in an extremely short amount of time and quite easily. The method described above can be used by anyone to create a conversion table without requiring the services of a skilled technician.

Accordingly, the present embodiment can reduce costs of developing the color copier described above. With the method of the present embodiment, it is possible to create conversion tables easily and at a low cost even for a highly functional color copier that needs to be installed with a plurality of different conversion tables.

The processes of each step described above in the method for creating the conversion table is executed as a program on the computer 30. This type of computer program can be stored on a storage medium capable of being read by the computer, such as a flexible disk, a magneto-optic disk, a CD-ROM, a hard disk, ROM, RAM, or the like. The program can be loaded and executed on the computer 30 according to need. It is also possible to load and execute the computer program via a network.

While the invention has been described in detail with reference to the specific embodiment thereof, it would be apparent to those skilled in the art that various changes and modifications may be made therein without departing from the spirit of the invention.

For example, the process of S30 may be omitted from the conversion table creating process of FIG. 3. In this case, the RGB-Lab relationship (FIG. 4(A)) with the 6,000 sets of original L*a*b* color data is used in place of the adjusted RGB-Lab relationship (FIG. 4(C)) in the subsequent processes.

More specifically, the conversion table 16 to be used in the color copier 10 for converting RGB scanned data to CMY print data is created in the following manner: In S10, L*a*b* values of the original image are obtained by measuring 6,000 color patterns with the colorimeter. RGB data for the 6,000 color patterns is also obtained by scanning the 6,000 color patterns with the color copier. In S20, the colorimeter 20 is used to measure an image, which has been printed by the color copier 10 based on CMY data for about 5,000 colors that is generated by the personal computer 30, in order to obtain L*a*b* values corresponding to the about 5,000 colors of CMY data. Then, in S40, CMY data corresponding to the L*a*b* values for the 6,000 colors is then determined based on the relationship between the CMY data and L*a*b* values for the about 5,000 colors using a triangular pyramid interpolating method, thereby determining CMY data corresponding to the 6,000 colors of RGB data in S50. In S60, the thus obtained RGB-CMY relationship data for 6,000 colors is compressed into RGB-CMY relationship data for 729 colors (729 lattice points in the RGB color space), using triangular pyramid interpolation, to obtain the conversion table 16.

In the above-described embodiment, in S10, the single color chart is printed with all the 6,000 colors. In S20, all the 4,913 colors are printed on a single paper. However, in S10, several color charts, each printed with only a part of the 6,000 colors, can be used. In S20, printing operation for printing only a part of the 4,913 colors can be executed several times. In this case, the scanning, recording, and color measuring processes may be performed in S10 and in S20 a plurality of times. In S10, the personal computer 30 integrates together information on several RGB-Lab relationships obtained by the several color charts. In S20, the personal computer 30 integrates together information on several CMY-Lab relationships obtained by the several print sheets.

While the embodiment described above employs the triangular pyramid interpolation method, it is possible to use other interpolation methods, such as an interpolation method employing data for three or more neighboring points, such as four neighboring points.

What is claimed is:

1. A method of creating a conversion table showing a relationship between scanned data and print data to be created by a color copier, the method comprising:
   a first step of measuring, by using a colorimeter, a plurality of colors in an original image to obtain colorimetric data of the plurality of colors on the original image, and reading, by using a color copier, the plurality of colors in the original image to obtain scanned data of the plurality of colors on the original image, thereby determining a first relationship between scanned data and colorimetric data for the plurality of colors in the original image;
   a second step of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets;
   a third step of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and
   a fourth step of creating, based on the fourth relationship, a conversion table showing a relationship between scanned data to be obtained by the color copier and print data desired to be obtained by the color copier.

2. The method as claimed in claim 1, wherein the third step determines the fourth relationship, for each set of scanned data, by performing an interpolation calculation onto the second relationship for several sets of colorimetric data that correspond to one set of colorimetric data that corresponds to the each set of scanned data according to the first relationship.

3. The method as claimed in claim 1, wherein the fourth step determines the conversion table, for each set of scanned data, by performing an interpolation calculation onto the fourth relationship for several sets of scanned data that correspond to the each set of scanned data.

4. The method as claimed in claim 1, wherein the conversion table shows relationship between each of a plurality of sets of scanned data, which are arranged at points set at predetermined intervals in a color space of the scanned data, and a set of print data.

5. The method as claimed in claim 1, further comprising a fifth step of determining a plurality of sets of target colorimetric data indicative of a plurality of target colors in a target original image based on the plurality of sets of colorimetric data indicative of the plurality of colors in the original image, and replacing the plurality of sets of colorimetric data in the first relationship with the plurality of sets of target colorimetric data,
   wherein the third step determines the third relationship as indicative of a relationship between the plurality of sets of target colorimetric data and the plurality of sets of print data for reproducing the target colorimetric data sets, and
   wherein the third step determines the fourth relationship as indicative of a relationship between scanned data of the plurality of target colors and print data for reproducing the plurality of target colors based on both of the third relationship and the first relationship.

6. The method as claimed in claim 5, wherein the fifth step determines the plurality of sets of target colorimetric data dependently on color reproducibility of the plurality of sets of colorimetric data of the plurality of colors in the original and color reproducibility of the color copier.

7. The method as claimed in claim 1, further comprising a sixth step of performing color copying operation by using the color conversion table.

8. The method as claimed in claim 1, wherein the first step is performed before the second step.

9. The method as claimed in claim 1, wherein the second step is performed before the first step.

10. A color copier, comprising:
   a table storing portion storing a conversion table showing a relationship between scanned data and print data, the conversion table being produced by a method including:
      a first step of measuring, by using a colorimeter, a plurality of colors in an original image to obtain colorimetric data of the plurality of colors on the original image, and reading, by using the color copier, the plurality of colors in the original image to obtain scanned data of the plurality of colors on the original image, thereby determining a first relationship between scanned data and colorimetric data for the plurality of colors in the original image;
      a second step of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets;
      a third step of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and
      a fourth step of creating, based on the fourth relationship, a conversion table showing a relationship between scanned data to be obtained by the color copier and print data desired to be obtained by the color copier; and
   a copying portion executing a color copying operation by using the color conversion table, the copying portion including: a scanning portion scanning a desired original image to produce scanned data; a conversion portion converting the produced scanned data into print data by using the conversion table; and a recording portion recording the print data to produce a copy product of the original image.

11. A computer readable medium for storing a computer program to create a conversion table showing a relationship between scanned data and print data to be created by a color copier, the program comprising:
   a first program of measuring, by using a colorimeter, a plurality of colors in an original image to obtain colorimetric data of the plurality of colors on the original image, and reading, by using a color copier, the plurality of colors in the original image to obtain scanned data of the plurality of colors on the original image, thereby determining a first relationship between scanned data and colorimetric data for the plurality of colors in the original image;
   a second program of printing, by using the color copier, a plurality of sets of predetermined print data indicative of another plurality of colors, and measuring the print results, by using the colorimeter, to obtain colorimetric data for the printed results of the plurality of predetermined print data sets, thereby determining a second relationship between the plurality of sets of predetermined print data and colorimetric data for the printed results of the plurality of predetermined print data sets;
   a third program of determining a third relationship between colorimetric data for the plurality of colors in the original image and print data for reproducing the plurality of colors in the original image based on the second relationship, and determining a fourth relationship between scanned data desired to be obtained by a copy result of the plurality of colors in the original image and print data for reproducing a desired copy of the plurality of colors in the original image based on both of the third relationship and the first relationship; and
   a fourth program of creating, based on the fourth relationship, a conversion table showing a relationship between scanned data to be obtained by the color copier and print data desired to be obtained by the color copier.

* * * * *